United States Patent [19]

Kulkarni et al.

[11] 4,374,178

[45] Feb. 15, 1983

[54] SILANATED CALCIUM CARBONATE FILLERS

[75] Inventors: Ravindra D. Kulkarni, Milpitas, Calif.; Errol D. Goodard, Haworth, N.J.

[73] Assignee: Union Carbide Corporation, Danbury, Conn.

[21] Appl. No.: 220,280

[22] Filed: Dec. 29, 1980

[51] Int. Cl.³ ............................................. B32B 5/16
[52] U.S. Cl. .................................... 428/404; 106/306; 428/330; 428/331; 428/405; 523/203; 523/212; 523/213; 524/426
[58] Field of Search ............... 428/404, 405, 330, 331; 106/306

[56] References Cited

U.S. PATENT DOCUMENTS

| | | | |
|---|---|---|---|
| 2,259,481 | 10/1941 | Mowlos | 106/295 |
| 2,259,482 | 10/1941 | Mowlos | 106/295 |
| 2,259,483 | 10/1941 | Mowlos | 106/295 |
| 2,470,577 | 5/1949 | Roderick et al. | 106/306 |
| 2,865,781 | 12/1958 | Wainer | 106/306 |
| 3,152,001 | 10/1964 | Podschus et al. | 106/306 |
| 3,443,890 | 5/1969 | Sisson et al. | 23/66 |
| 4,167,423 | 9/1979 | Williams | 106/306 |

FOREIGN PATENT DOCUMENTS

838903 6/1960 United Kingdom .

*Primary Examiner*—J. Ziegler
*Attorney, Agent, or Firm*—Paul W. Leuzzi, II

[57] ABSTRACT

Calcium carbonate is rendered receptive to silanation by pretreatment with soluble sodium silicate.

2 Claims, No Drawings

SILANATED CALCIUM CARBONATE FILLERS

BACKGROUND OF THE INVENTION

1. Field of the Invention

This invention relates to novel filler compositions comprising calcium carbonate, sodium silicate, and organosilane coupling agents, to processes for preparing said filler compositions, and to their use in polymer composites.

2. Description of the Prior Art

It has long been known that various particulate inorganic substances can be used as fillers to improve the economical and/or mechanical properties of natural and synthetic resins. It has been known for almost as long that the benefits of siliceous fillers, such as silica, quartz, asbestos, glass, and various clays on the mechanical properties of polymer composites can be significantly enhanced by employing organosilane coupling agents in addition to the fillers.

Calcium carbonate is a widely available and economical (i.e., cheap) substance which in particulate form would be suitable for use as a filler. However, presumably because it is not siliceous in nature, it is not very responsive to treatment with organosilane coupling agents; without such treatment, polymer composites filled with calcium carbonate do not show satisfactory mechanical properties.

Two approaches have been developed to modify the surfaces of nonresponsive fillers such as calcium carbonate. One deals with the coprecipitation of such fillers with silicas: U.S. Pat. Nos. 2,470,577, 2,865,781, 3,152,001, 3,443,890 and British Pat. No. 838,903. The other deals with in situ precipitation of insoluble silicates over the filler surface: U.S. Pat. Nos. 2,259,481, 2,259,482, 2,259,483, and 4,167,423.

SUMMARY OF THE INVENTION

By the present invention, silane-unresponsive calcium carbonate is easily and economically transformed into a silane-responsive filler by treatment with soluble sodium silicate.

DESCRIPTION OF THE PREFERRED EMBODIMENTS

A compositional manifestation of the present invention is a calcium carbonate filler which comprises a mixture of (I) particulate calcium carbonate, (II) sodium silicate, and (III) a silane coupling agent having the formula $R(R^1)_a Si(X)_{3-a}$ wherein R which contains a carbon atom directly bonded to the silicon atom of the above formula represents a functionally substituted organic radical or a straight-chain alkyl radical of from 7 to 22 carbon atoms, $R^1$ represents a radical selected from the group consisting of R and monovalent hydrocarbon radicals containing from 1 to 6 carbon atoms, a has a value of 0 or 1, and X represents a hydrolyzable group, the hydrolyzates of said silanes, the condensates of said silanes, and mixtures thereof, which composition has been heated to a temperature in the range about 100° C. to about 140° C. for a period of time in the range about one to about eight hours.

The organosilane coupling agents (III) and/or methods for their preparation are well known in the art and include e.g. organofunctional silanes having the formula given above wherein R which contains a carbon atom directly bonded to the Si atom of the above formula represents a functionally substituted organic radical, $R^1$ represents a radical selected from the group consisting of R and monovalent hydrocarbon radicals containing from 1 to 6 carbon atoms, e.g. phenyl and alkyl radicals, especially methyl, a has a value of 0 or 1, preferably 0, and X represents a hydrolyzable group the hydrolyzates of said silanes, the condensates of said silanes, and mixtures thereof. Illustrative of the more preferred functionally substituted organic radicals are unsaturated organic radicals such as olefinic radicals, e.g. vinyl, allyl, gamma-methacryloxypropyl, and the like; amino-substituted radicals such as aminoalkyl radicals e.g. beta-aminoethyl, gamma-aminopropyl, N-beta(aminoethyl) gamma-aminopropyl, and the like; epoxy substituted radicals such as beta-(3,4-epoxycyclohexyl)-ethyl, gamma-glycidoxypropyl, and the like; and mercapto substituted radicals, such as beta-mercaptoethyl, gamma-mercaptopropyl, and the like. Among the more preferred silane coupling agents that may be mentioned are vinyltrichlorosilane, vinyltriethoxysilane, vinyltrimethoxysilane, vinyltris(2-methoxyethoxy)-silane, gamma-methacryloxypropyltrimethoxysilane, beta-(3,4-epoxycyclohexyl)ethyltrimethoxysilane, gamma-glycidoxypropyltrimethoxysilane, vinyltriacetoxysilane, beta-mercaptoethyltriethoxysilane, gamma-mercaptopropyltrimethoxysilane, beta-aminoethyltriethoxysilane, gamma-aminopropyltriethoxysilane, gamma-aminopropyltriethoxysilane, N-beta-(aminoethyl)-gamma-aminopropyltrimethoxysilane, and the like.

Additional silanes which may be used in the practice of this invention include the following:

$HOOC(CH_2)_8CHSi(OCH_3)_3$

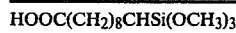

$CH_3CH_2=CH(CH_2)_4CH_2Si(OCH_3)_3$

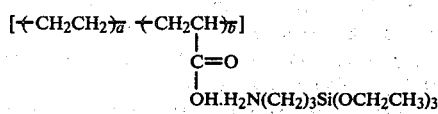

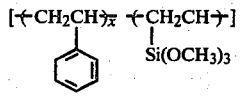

$HOOCCH_2CH_2Si(OCH_2CH_3)_3$

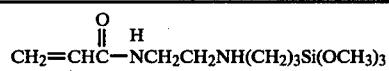

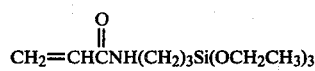

$CH_2=CHCH_2Si(OCH_2CH_2OCH_3)_3$

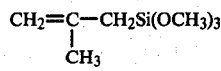

$HSCH_2Si(OCH_3)_3$

-continued

NCCH₂CH₂Si(OCH₂CH₃)₃

H₂N(CH₂)₄Si(OC₂H₅)₃

H₂NCH₂CH₂NHCH₂CH₂NHCH₂CH₂CH₂Si(OC₂H₅)₃

$$\underset{H_2NCNHCH_2CH_2CH_2Si(OCH_3)_3}{\overset{O}{\underset{\|}{}}}$$

$$\underset{H_2NCNHCH_2CH_2N(CH_2)_3Si(OCH_3)_3}{\overset{O}{\underset{\|}{}} \overset{C-NH_2}{\underset{|}{}}}$$

$$\underset{H_2NC-NH(CH_2)N-(CH_2)_2-NH(CH_2)_3Si(OCH_3)_3}{\overset{O}{\underset{\|}{}} \overset{H_2N-C=O}{\underset{|}{}}}$$

polyethyleneimine-(CH₂)₃Si(OCH₃)₃
polyethyleneimine-[(CH₂)₃Si(OCH₃)₃]₂

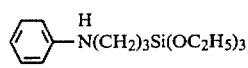

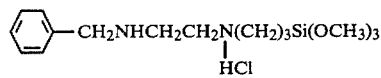

HOCH₂CH₂CH₂Si(OC₂H₅)₃

H₂NCH₂Si(OC₂H₅)₃
HOCH₂Si(OCH₃)₃

$$\underset{CH_3}{\underset{|}{H_2NCHCH_2Si(OC_2H_5)_3}}$$

polyazamide-[CH₂CH₂CH₂Si(OCH₃)₃]₁₋₅ (see U.S. Pat. No. 3,746,348 patented July 17, 1973, for a complete description of silylated polyazamides)
CH₂=C(CH₃)COO(CH₂)₃Si(OCH₂CH₂OCH₃)₃

HSCH₂Si(OCH₂CH₃)₃

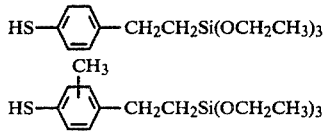

$$\underset{HOCCH=CHC-OCH_2CH_2CH_2Si(OCH_3)_3}{\overset{O}{\underset{\|}{}} \overset{O}{\underset{\|}{}}}$$

$$\underset{HSCH_2CH_2CH_2CNH(CH_2)_3Si(OCH_2CH_3)_3}{\overset{O}{\underset{\|}{}}}$$

$$\underset{HOCH_2CH_2CH_2CH_2CH_2CNH(CH_2)_3Si(OC_2H_5)_3}{\overset{O}{\underset{\|}{}}}$$

(CH₃CH₂O)₃SiCH₂CH₂CH₂S—S—S—CH₂CH₂CH₂Si(OCH₂CH₃)₃
(CH₃CH₂O)₃Si(CH₂)₃—S—S—(CH₂)₃Si(OCH₂CH₃)₃

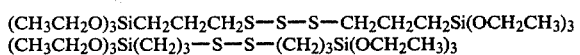

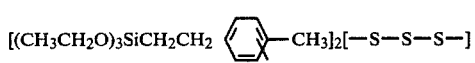

$$\underset{CH_2-CHSi(OCH_3)_3}{\overset{O}{\diagup \diagdown}}$$

$$\underset{CH_3CH_2OCNH(CH_2)_3Si(OC_2H_5)_3}{\overset{O}{\underset{\|}{}}}$$

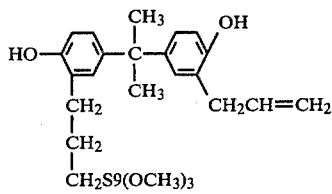

and other coupling agents known to those skilled in the art such as octyltrimethoxysilane, monyltriethoxysilane, dodecylmethyldichlorosilane, and the like.

As used herein, the terminology "coupling agent" refers to silanes containing one or more hydrolyzable groups which interact with calcium carbonate and one or more organic groups which react with or are compatible with polymeric substrates.

Commercial soluble sodium silicates include sodium orthosilicate ($Na_4SiO_4$), sodium metasilicate ($Na_2SiO_3$), sodium disilicate ($Na_2Si_2O_5$), and some more highly siliceous sodium silicates whose $Na_2O:SiO_2$ ratios approach 1:4, a very common example of which is called "water glass" ($Na_2O:SiO_2$ in a 1:3.3 ratio). Sodium metasilicate has been found to be a convenient soluble sodium silicate to use in the present invention; others however would also be useful.

The amount of sodium silicate (II) to be used according to the present invention ranges from about 0.1 to about 10 percent based upon the weight of the calcium carbonate (I). The greater the surface area of the calcium carbonate, the more sodium silicate required. A preferred range is from about 0.3 to about 3 percent, and more preferably to about 1 percent.

The amount of silane coupling agent (III) that can be employed in forming the silane-modified sodium silicate-treated calcium carbonate compositions of this invention is not narrowly critical. It can conceptually range from about 0.01 to about 50 percent based upon the weight of the calcium carbonate (I), but will more generally range from about 0.1 to about 10 percent.

Processing parameters which may be followed according to the present invention are not narrowly critical. Two approaches which have been found to be efficacious are the "Wet Slurry Process" and the "Dry Blending Process".

In the Wet Slurry Process, calcium carbonate is mixed with two or three times its weight in water, although more or less may be used. The sodium silicate is mixed into the calcium carbonate slurry, and, subsequently, the silane is mixed into the sodium silicate-treated slurry, conveniently in the form of a premix with methanol or ethanol and water or aluminum nitrate, to enhance dispersion. The silanated slurry is then filtered, and the solids are oven-dried, e.g. at about 100° C. to about 140° C. for from about 1 to about 8 hours. The dried solids may then be stored until used.

In the Dry Blending Process, an aqueous solution of sodium silicate is blended with calcium carbonate. To the blend is added the silane, conveniently mixed with a carrier such as microcrystalline cellulose to facilitate handling. The silanated mixture may be tumbled, oven-dried for a short period, and re-tumbled hot, to insure good mixing. Finally, the composition is heat-treated for from about 1 to about 8 hours at from about 100° C. to about 140° C.

As indicated above, by the present invention, silane-unresponsive calcium carbonate is easily and economically transformed into a silane-responsive filler by treatment with soluble sodium carbonate. By contrast, prior art such as U.S. Pat. No. 4,167,423 requires an in situ precipitation of insoluble silicate over the calcium carbonate surface. Examples hereinbelow demonstrate by various means that, by the present invention, soluble sodium silicate can in fact be used to improve the bonding of silanes to calcium carbonate.

The organosilane-modified sodium silicate-treated calcium carbonate compositions of the present invention can be used as reinforcing fillers in polymer composite formations in the manner described for organosilane-modified other metal silicate-treated mineral compositions in U.S. Pat. No. 4,167,423. The improved silane-calcium carbonate bonding achieved by the present invention would be expected to result in improved bonding of the filler in composite based on rubber, polyesters, and the like. They may thus be employed in rubbers, thermoplastic and thermosetting resins, paints, varnishes, inks, and the like.

EXAMPLES

The following Examples serve to illustrate the present invention. Examples 1 and 2 demonstrate the preparation of sodium silicate-treated calcium carbonate fillers according to the present invention, while Examples A and B for comparison show similar calcium carbonate fillers which have not been treated with sodium silicate and which are not within the scope of the present invention.

EXAMPLE A

To a mixing bowl were added 400 grams of particulate calcium carbonate and 1200 grams of distilled water. The calcium carbonate and water were mixed at 1500 revolutions-per-minute for two minutes. Then, while mixing continued, 8 grams of a premix consisting of 4 grams of octyl trimethoxysilane, 3.6 grams of methanol, and 0.4 grams of distilled water were added. After the addition was complete, mixing was continued for 45 seconds. The mixture was then filtered, and the filtrate was dried for two hours at 110° C., whereupon all large chunks were broken up and drying was continued for one hour at 110° C.

EXAMPLE B

To a mixing bowl were added 400 grams of particulate calcium carbonate and 1200 grams of distilled water. The calcium carbonate and water were mixed at 1500 revolutions-per-minute for two minutes. Then, while mixing continued, 8 grams of a premix consisting of 4 grams of octyl trimethoxysilane, 3.6 grams of methanol, and 0.4 grams of aluminum nitrate were added. After the addition was complete, mixing was continued for 45 seconds. The mixture was then filtered, and the filtrate was dried for two hours at 100° C., whereupon the large chunks were broken up and drying was continued for one hour at 110° C.

EXAMPLE 1

To a mixing bowl were added 400 grams of particulate calcium carbonate and 1200 grams of distilled water. The calcium carbonate and water were mixed at 1500 revolutions-per-minute for two minutes. Then, the filler was treated with 4 grams of hydrated sodium metasilicate. While mixing continued, 8 grams of a premix consisting of 4 grams of octyl trimethoxysilane, 3.6 grams of methanol, and 0.4 grams of distilled water were added. After the addition was complete, mixing was continued for 45 seconds. The mixture was then filtered, and the filtrate was dried for two hours at 110° C., whereupon the large chunks were broken up and drying was continued for one hour at 110° C.

EXAMPLE 2

To a mixing bowl were added 400 grams of particulate calcium carbonate and 1200 grams of distilled water. The calcium carbonate and water were mixed at 1500 revolutions-per-minute for two minutes. Then, the filler was treated with 4 grams of hydrated sodium metasilicate. While mixing continued, 8 grams of a premix consisting of 4 grams of octyl trimethoxysilane, 3.6 grams of methanol, and 0.4 grams of aluminum nitrate were added. After the addition was complete, mixing was continued for 45 seconds. The mixture was then filtered, and the filtrate was dried for two hours at 110° C., whereupon the large chunks were broken up and drying was continued for one hour at 110° C.

CONTACT ANGLES

The following table indicates the aging characteristics of the contact angle of silanated calcium carbonate samples obtained as in Examples A, B, 1, and 2. The contact angles were of distilled water drops on flat compressed pellets of the silanated calcium carbonate sample. The contact angles were measured as a function of the age of the drop on the pellet.

| Time (in seconds) | Contact Angles (in degrees) | | | |
| --- | --- | --- | --- | --- |
| | Ex. A | Ex. B | Ex. 1 | Ex. 2 |
| 30 | 105 | 114 | — | 148 |
| 60 | 96 | 109 | 150 | 148 |
| 90 | 95 | 105 | 150 | 148 |
| 120 | 95 | 97 | 150 | 148 |
| 180 | 93 | 91 | 150 | 148 |
| 240 | 90 | 85 | 150 | 148 |

The samples corresponding to Examples A and B, which contain no sodium silicate, show strong aging effects. The rapid decrease in contact angle is believed to be due to the combined effect of a loss of silane from the surface and a lowering of the water's surface tension by silane contamination.

In contrast, the samples corresponding to Examples 1 and 2, which were treated with sodium silicate, show very pronounced contact angles which do not age at all (at least within the four minute experimental time frame). This indicates a high degree of surface hydrophobicity and a stable silane-filler bond. It is believed that the heat treatment of the samples promotes the formation of a strong chemical bond between the sodium silicate and the calcium carbonate.

DRY BLENDING PROCESS

The following Examples demonstrate the dry (i.e., low level of water) blending process which constitutes a preferred process according to the present invention. Examples 3 and 4 illustrate the present invention; Example 4 has an additional early heat treatment as compared to Example 3. Examples C and D are presented for contrast and do not fall within the scope of the claims. Example C corresponds to Example 3. Example D shows the use of hydrophilic silica as opposed to the sodium silicate of the present invention.

EXAMPLE 3

To a twinshell blender were added 2000 grams of calcium carbonate and 125 grams of a six percent by weight aqueous solution of sodium metasilicate. Blending was carried out for one-half hour, at which point 20 grams of a dry silane concentrate (consisting of 70 parts by weight of octyltrimethoxysilane dispersed onto 30 parts of microcrystalline cellulose for convenience in handling) was added and the mixture was tumbled for one-half hour. The mixture was then oven-dried at 120° C. for one-half hour, subsequently tumbled for one-half hour in hot condition, and finally heat-treated at 120° C. for two hours, after which it was stored.

EXAMPLE 4

To a twinshell blender were added 2000 grams of calcium carbonate and 125 grams of a six percent by weight aqueous solution of sodium metasilicate. Blending was carried out for one-half hour, followed by a heat-treatment at 120° C. for two hours, at which point 20 grams of a dry silane concentrate (consisting of 70 parts by weight of octyltrimethoxysilane dispersed onto 30 parts of microcrystalline cellulose for convenience in handling) was added and the mixture was tumbled for one-half hour. The mixture was then oven-dried at 120° C. for one-half hour, subsequently tumbled for one-half hour in hot condition, and finally heat-treated at 120° C. for two hours, after which it was stored.

EXAMPLE C

To a twinshell blender were added 2000 grams of calcium carbonate. Blending was carried out for one-half hour, at which point 20 grams of a dry silane concentrate (consisting of 70 parts by weight of octyltrimethoxysilane dispersed onto 30 parts of microcrystalline cellulose for convenience in handling) was added and the mixture was tumbled for one-half hour. The mixture was then oven-dried at 120° C. for one-half hour, subsequently tumbled for one-half hour in hot condition, and finally heat-treated at 120° C. for two hours, after which it was stored.

EXAMPLE D

To a twinshell blender were added 2000 grams of calcium carbonate. Blending was carried out for one-half hour and then 20 grams of a silica (Cab-o-Sil Ms 75) were added and blending was continued for one-half hour, at which point 20 grams of a dry silane concentrate (consisting of 70 parts by weight of octyltrimethoxysilane dispersed onto 30 parts of microcrystalline cellulose for convenience in handling) was added and the mixture was tumbled for one-half hour. The mixture was then oven-dried at 120° C. for one-half hour, subsequently tumbled for one-half hour in hot condition, and finally heat-treated at 120° C. for two hours, after which it was stored.

CONTACT ANGLES

The following table indicates the aging characteristics of the contact angle of silanated calcium carbonate samples obtained as in dry blend Examples 3, 4, C, and D. The contact angles were of distilled water drops on flat compressed pellets of the silanated calcium carbonate sample. The contact angles were measured as a function of the age of the drop on the pellet.

| Time (in seconds) | Contact Angles (in degrees) | | | |
| --- | --- | --- | --- | --- |
| | Ex. 3 | Ex. 4 | Ex. C | Ex. D |
| 30 | 131 | 127 | 68 | 68 |
| 60 | 131 | 127 | 54 | 52 |
| 90 | 131 | 127 | 44 | 41 |
| 120 | 131 | 127 | 34 | 32 |
| 150 | 131 | 127 | 29 | 26 |
| 180 | 131 | 127 | 22 | 19 |
| 210 | 131 | 127 | 14 | 11 |

The samples corresponding to Examples 3 and 4 show very pronounced contact angles which did not age at all within the experimental frame. This indicates a high degree of surface hydrophobicity and stable silane-calcium carbonate bonding. In contrast, similarly produced samples C and D, which, however, were not treated with sodium silicate according to the present invention, show strong aging effects. The rapid decrease in contact angle is believed to be due to the combined effects of loss of silane from the calcium carbonate surface and a lowering of the water's surface tension by silane contamination.

WET SLURRY PROCESS

EXAMPLE 5

To a Denver cell mixer were added 400 grams of calcium carbonate and 800 grams of water. Mixing was carried out for two minutes. Then 4.0 grams of sodium metasilicate monahydrate were added and mixing was continued for two minutes. To the resulting blend were added 8 grams of a premix composed of 4 grams of octyltrimethoxysilane, 3.6 grams of methanol, and 0.4 grams of 0.2 N aluminum nitrate. Mixing was continued for two minutes, the mixture was filtered, and the solids were oven-dried at 120° C. for four hours.

EXAMPLE E

To a Denver cell mixer were added 400 grams of calcium carbonate and 800 grams of water. Mixing was carried out for two minutes and then 8 grams of a premix composed of 4 grams of octyltrimethoxysilane, 3.6 grams of methanol, and 0.4 grams of 0.2 N aluminum nitrate was added. Mixing was continued for two minutes, the mixture was filtered, and the solids were oven-dried at 120° C. for four hours.

CONTACT ANGLES

Contact angles were determined as above, with comparable results.

| Time (in seconds) | Contact Angles (in degrees) | |
|---|---|---|
| | Ex. 5 | Ex. E |
| 30 | — | 105 |
| 90 | 140 | — |
| 120 | — | 95 |
| 240 | 140 | 90 |
| 360 | — | 80 |
| 480 | — | 70 |
| 576 | 140 | 60 |
| 730 | — | 49 |
| 900 | — | 40 |

FILLER DESORPTION TEST

Another test which is indicative of the degree to which the silane is bonded to the calcium carbonate surface is the filler desorption test (FDT). In this test a known amount, typically 0.1 gram, of treated sample is sprinkled onto a pure water surface possessing a 72.6 dynes/centimeter initial surface tension value. The surface tension of the water is then recorded as a function of time. If the silane is only physically adsorbed on the filler surface, then it should slowly desorb and spread on the water. Such transfer of silane molecules should result in a change in surface tension of the water. On the contrary, if the silane is chemically bonded to the filler surface and the bonds are stable even in the presence of water, then one would not expect any change in water surface tension with time. The treated particles in this case will remain hydrophobic and float on the water surface. Thus, the extent and the rate of change of surface tension of water as a function of time are a measure of the nature and the degree of silane bonding.

| Time (in minutes) | Surface Tension (in dynes/centimeter) | | | |
|---|---|---|---|---|
| | Ex. 3 | Ex. 4 | Ex. 5 | Ex. C |
| 1 | 70 | 56 | 72 | 72 |
| 2 | — | — | — | 42 |
| 3 | 63 | — | — | — |
| 4 | — | 54 | 72 | 33 |
| 5 | 66 | — | — | — |
| 6 | — | 53 | — | — |
| 7 | — | — | 72 | 34 |
| 8 | 68 | — | 72 | — |
| 9 | — | — | — | — |
| 10 | — | 51.5 | 72 | 37 |
| 11 | 69 | — | — | — |
| 12 | — | — | 72 | — |
| 13 | — | 51.5 | — | — |
| 14 | 70 | — | 72 | — |
| 15 | — | 51.5 | — | 39 |

The table depicts the FDT test results for various silanated calcium carbonate surfaces. Here again, samples obtained using Treatment C, containing no sodium silicate, showed a rather rapid drop in surface tension indicating poor adhesion of silane to the filler surface. Samples obtained through Treatments 5 and 3, both sodium silicate pre-treated and produced, respectively, by the wet slurry and dry blend techniques, demonstrated excellent stability of silane at the surface, with the wet slurry treated one slightly outperforming the other. An interesting feature is the behavior of samples obtained using Treatment 4 which shows intermediate stability of the silane at the surface. Here, like the sample from Treatment 3, the sample of CaCO$_3$ was dry blended with sodium silicate solution. However, in this case, unlike the sample from Treatment 3, the sample was dried at 120° C. for two hours before further reacting it with silane. The implication is that perhaps the loss of water has lowered the reactivity of these surfaces towards silanes.

The overall implication of the above results is that the addition of sodium silicate is critical in developing a silane-responsive surface on calcium carbonate. The purpose of silicate addition is to adsorb silicate on the CaCO$_3$ through calcium silicate bond formation leaving a large number of reactive silanol groups capable of reacting with added silane. Mere addition of fine silica, which cannot chemically adsorb on CaCO$_3$, see Example D, does not yield the desired surface sensitization.

Various modifications and variations of this invention will be readily apparent to those skilled in the art. It is to be understood that such modifications and variations are to be included within the purview of this invention and the spirit of the present claims.

What is claimed is:

1. A calcium carbonate filler composition which comprises a mixture of
   (I) particulate calcium carbonate,
   (II) sodium silicate, and
   (III) a silane having the formula $$R(R^1)_a Si(X)_{3-a}$$

wherein R which contains a carbon atom directly bonded to the silicon atom of the above formula represents an organic radical, $R^1$ represents a radical selected from the group consisting of R and monovalent hydrocarbon radicals, a has a value of 0 or 1, and X represents a hydrolyzable group, the hydrolyzates of said silanes, the condensates of said silanes, and mixtures thereof, which composition has been heated to a temperature in the range 100° C. to 140° C. for a period of time in the range one to eight hours.

2. A calcium carbonate filler composition as in claim 1 wherein component (III) is octyl trimethoxysilane.

* * * * *